US011613656B2

(12) United States Patent
Van Der Net

(10) Patent No.: US 11,613,656 B2
(45) Date of Patent: Mar. 28, 2023

(54) METHOD FOR PREVENTING HARDENER COMPOUNDS TO BE FORMED FROM HARDENER PRECURSORS IN AN AEROSOL FORMULATION AND A TWO-COMPONENT AEROSOL FORMULATION

(71) Applicant: Wisespray International Ltd, Helsinki (FI)

(72) Inventor: Hendrik Van Der Net, PV Scharnegoutum (NL)

(73) Assignee: Wisespray International Ltd, Helsinki (FI)

( * ) Notice: Subject to any disclaimer, the term of this patent is extended or adjusted under 35 U.S.C. 154(b) by 275 days.

(21) Appl. No.: 16/060,478

(22) PCT Filed: Nov. 24, 2016

(86) PCT No.: PCT/FI2016/050829
§ 371 (c)(1),
(2) Date: Jun. 8, 2018

(87) PCT Pub. No.: WO2017/098080
PCT Pub. Date: Jun. 15, 2017

(65) Prior Publication Data
US 2018/0362776 A1  Dec. 20, 2018

(30) Foreign Application Priority Data
Dec. 9, 2015 (FI) .................................... 20155933

(51) Int. Cl.
| | | |
|---|---|---|
| C09D 5/02 | (2006.01) | |
| C09D 163/04 | (2006.01) | |
| C08G 59/18 | (2006.01) | |
| C09D 163/00 | (2006.01) | |
| C09K 3/30 | (2006.01) | |
| C08K 5/07 | (2006.01) | |
| C08K 5/09 | (2006.01) | |
| C08K 5/353 | (2006.01) | |
| C09D 7/20 | (2018.01) | |
| C09D 7/63 | (2018.01) | |

(52) U.S. Cl.
CPC ............ *C09D 5/021* (2013.01); *C09D 163/04* (2013.01); *C08G 59/184* (2013.01); *C08G 59/186* (2013.01)

(58) Field of Classification Search
None
See application file for complete search history.

(56) References Cited

U.S. PATENT DOCUMENTS 5,219,979 A * 6/1993 Greco ................. C07D 263/04
525/398
2001/0014700 A1  8/2001 Kwasny
2004/0019161 A1  1/2004 Endo et al.
2009/0281253 A1  11/2009 Okamoto et al.
2013/0005885 A1  1/2013 Sunayama et al.

FOREIGN PATENT DOCUMENTS

| CA | 2935321 A1 | 8/2015 |
|---|---|---|
| EP | 1427767 B1 | 1/2005 |
| EP | 1125997 B1 | 5/2008 |
| JP | H0841155 A | 2/1996 |
| JP | 2000038542 A * | 2/2000 |
| JP | 2000038542 A | 2/2000 |
| JP | 2001247655 A * | 9/2001 |
| JP | 2002249544 A | 9/2002 |
| JP | 2004035947 A * | 2/2004 |
| JP | 2004035947 A | 2/2004 |
| JP | 2004530749 A | 10/2004 |
| JP | 2007276391 A | 10/2007 |
| WO | 2014057764 A1 | 4/2014 |
| WO | 2015117846 A1 | 8/2015 |

OTHER PUBLICATIONS

Finnish Patent Office, Search Report issued in FI patent application No. 20155933 dated Apr. 1, 2016.
Finnish Patent Office, Office Action issued in FI patent application No. 20155933 dated Feb. 14, 2018.

* cited by examiner

Primary Examiner — Randy P Gulakowski
Assistant Examiner — Ha S Nguyen
(74) Attorney, Agent, or Firm — Meunier Carlin & Curfman LLC

(57) ABSTRACT

A method for preventing hardener compounds to be formed from hardener precursors in an aerosol formulation suitable for use in aerosol for making a paint is disclosed.

20 Claims, No Drawings

METHOD FOR PREVENTING HARDENER COMPOUNDS TO BE FORMED FROM HARDENER PRECURSORS IN AN AEROSOL FORMULATION AND A TWO-COMPONENT AEROSOL FORMULATION

PRIORITY

This application is a U.S. national application of the international application number PCT/FI2016/050829 filed on Nov. 24, 2016 and claiming priority of Finnish national application FI20155933 filed on Dec. 9, 2015, the contents of all of which are incorporated herein by reference.

FIELD OF THE INVENTION

The present invention relates to a stable aerosol formulation for making a paint or adhesive from raw material which is paint related. Said formulation comprises an epoxy resin and a hardener precursor for aerosol cans.

A method for controlling the effect of water in an aerosol formulation suitable for use in can for making a paint or an adhesive.

BACKGROUND ART

A variety of aerosol formulations for aerosol paint and adhesive systems, packed in cans have been known for years. One-component aerosol paint and adhesive formulations have been the most important ones, but two-component paint and adhesive systems composing of two-component paint or adhesive formulations have been gaining more importance in the last few years.

The one-component aerosol formulations are suitable for use in conventional aerosol cans, that is, in aerosol cans having only one chamber. The two-component aerosol formulations are usually suitable only for aerosol cans having at least two chambers.

Two-component aerosol paint and adhesive systems comprise a binder, a curing component such as hardener or cross-linking component, a propellant and optionally a solvent in an aerosol can. The binder and the hardener are typically packed in separate chambers in the aerosol can. These types of aerosol cans are also referred to as "can in a can" cans or "2-chamber" cans. Just before using the can one of the chambers is punctured so that the binder and the hardener are brought into contact with each other inside the can. Reaction between the binder and hardener starts immediately when they are contacted in the can and the aerosol formulation is ready to be used for spraying.

Polyurethane system is one example of a two-component aerosol paint system. The two-component polyurethane aerosol formulation comprises a binder component, a hydroxyl group containing acrylate or polyester resin, and a polyisocyanate as curing component in a separate chamber. Aerosol paint cans of this type are employed to apply primers, undercoats, finishing coats, etc., primarily for vehicles such as passenger cars, trucks, busses, railroads, and containers.

EP 1125997 B1 discloses an aerosol formulation for two-component aerosol paint system in cans. The paint material, which consists of acrylic resins containing hydroxyl groups, and the hardener, which consists of aliphatic polyisocyanates are filled in two separate chambers within an aerosol can and united only immediately prior to their application. The components are jointly sprayed from the aerosol can via propellant gas consisting of a propane/butane mixture.

An epoxy system is another example of a two-component aerosol paint and adhesive system. The epoxy system comprises an epoxy resin parent compound as binder and usually an amine as hardener. The two-component epoxy systems are used, additionally to automotive purposes, for general industrial and household industrial purposes, for building sector, machinery construction industry etc. For example, EP 1427767 B1 discloses a two-component aerosol paint and adhesive system packed in a can with an epoxy paint and adhesive system especially suited for repair purposes. The aerosol paint and adhesive system in an aerosol can contains an aerosol formulation based on two-component epoxy technology comprising (i) a parent epoxy resin, (ii) a solvent mixture, (iii) a propellant gas, and (iv) an epoxy curing agent in a separate chamber to be used as hardening constituent for the parent epoxy resin.

In the known two-component aerosol paint and adhesive systems the binder and the hardener are placed in separate chambers within an aerosol can so that reaction between the binder and hardener is not possible. As soon as the binder and hardener are brought into contact by puncturing one of the chambers, hardening reaction starts immediately in aerosol formulation. Therefore this kind of aerosol formulations should be used entirely at once because the hardening reaction starts already inside the can. Shelf life of such two-component aerosol paint and adhesive systems is limited to maximum of 2-3 days. Additionally, the 2-chamber aerosol cans are complicated and expensive to manufacture.

Epoxy resin based paint and adhesive systems, utilizing one compartment i.e. single chamber cans are available, as well. In these systems the individual reactive components are in latent form before taking the can into use. However, there two main drawbacks in these solutions; either they do not stand for moisture at all or alternatively good quality paints cannot be prepared from them.

The latter drawback is due to fact that, to assure the stability of total mixture of an aerosol in a can these aerosols known from prior art contain ether so much dry water scavengers or liquid water scavengers, that it will completely change the structure and quality of the coating to be made from these aerosol formulation. Water scavengers are not paint related material. To block the effect of the ambient moisture in epoxy resin based paint and adhesive formulas it has been used several liquid and dry water scavenger, which will affect to ketone-imine balance and thus formation of (epoxy) hardener compounds (amines) in reactions (1a-1c):

$$\text{Amine (epoxy hardener)} + \text{ketone} \longleftarrow \text{Imine (epoxy hardener precursor)} + H_2O \text{ or} \quad (1a)$$

$$\text{Amine (epoxy hardener)} + \text{ketone} \xrightarrow{-H_2O} \text{Imine (epoxy hardener precursor)}. \quad (1b)$$

Which can also be presented as a reversible balance reaction:

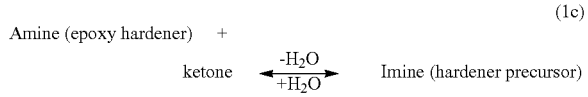

(1c)

In reactions 1a-1c epoxy hardener precursors can be also aldimines, enamines or Mannich bases instead of imines.

If there is water present in an aerosol can, an imine reacts with water forming an amine and a ketone. Thus the presence of water in an aerosol can, might let to take place an hydrolyse reaction (1a) in which imine is hydrolysed to corresponding amine which can then take art of curing reaction between said amine and an epoxy resin.

By removing water from the right side of the hydrolysing reaction (1a) or by removing water from eliminating stage in condensing reaction (1b) with water scavengers, one can either prevent the amines (epoxy hardener compounds) to be formed in reaction (1a) or to shift reaction (1b) to favour forming imines (epoxy hardener precursors) instead of amines (epoxy hardeners).

In the prior art the inventors have been added big amounts of water scavengers to control the formation of epoxy hardeners in the above mentioned reaction (1a) between imine and water. Removing water with scavengers also shifts reaction (1b) into formation more imines. The amount of water scavengers used to control reactions 1a and 1b have been so high that it has deteriorated the quality of coating to be achieved. Use of water scavengers will tend to prevent making high quality paints because surface of paint film will remain soft or brittle and making a clear coat high gloss or a colour high gloss is also impossible if high amount of water scavengers are used in an aerosol formulation to control formation of epoxy hardeners. Therefore good quality paints cannot be prepared from these known one-can-two-component-aerosol-formulation(s).

For example, the abstract of JP2004035947 discloses a two component aerosol formulation for an aerosol can. The formulation comprises an epoxy resin such as bisphenol A type, an imine as hardener precursor and a propellant. The drawback and challenge in this type of solution is typically the presence of moisture in the aerosol formulation causing premature hardening already in the can. Therefore, zero ambient moisture for the precursors and the packaging ambient is a key requirement. Additionally, in this patent document it have been proposed that ensuring the dry conditions should be done by adding water scavengers. As mentioned above adding water scavengers will prevent forming hardener compounds prematurely because it will affect to imine-keton balance in reactions (2a) and (2b). However, the addition of water scavengers will affect negatively to paint quality and therefore the primary use of the disclosed two component aerosol of this kind is as a primer with gloss <5.

Patent document JP2004035947 discloses also an epoxy resin based two component aerosol formulation, which can be used in an aerosol can, wherein the epoxy resin and a hardener are mixed extended time in the same room of the aerosol can before manufacturing the paint or lacquer. However, also this patent document uses water scavengers to remove excess water from aerosol. These scavengers will make it impossible to achieve commercial 2 K paints or lacquers with high gloss. The scavengers have a negative impact in paint quality by making the paint film soft and brittle. Even if used as primers, the quality of the paint film is much lower due to high amount of non-paint related material in the film.

The abstract of JP2002249544 discloses a one-pack moisture-curable epoxy resin and an imine as hardener precursor for a formulation having excellent storage stability. The preparation of the formulation and precursor handling of the imine requires moisture free conditions obtained by use of nitrogen atmosphere and specifically predried precursors. Similarly, the formulation hardens immediately when contacted with atmospheric moisture.

DESCRIPTION OF THE INVENTION

The target of the present invention was to remove drawback of the prior art mentioned above.

Based on the above presented prior art there was a need for an epoxy based two-component aerosol paint and adhesive system that has a long shelf life, is simple to manufacture and use, can be reused, does not harder prematurely due to ambient moisture and which enables making high quality paints. To be more specified the objectives are:

The first main object of the present invention is thus to provide an epoxy resin based aerosol formulation, such as paint and adhesive system, that has a good stability and a long shelf life.

The second main object of the present invention is to control reaction balance between the epoxy hardener precursors and epoxy hardeners (amines) so that making high quality paints are enabled. This second objective means that the objective of the present invention is to prevent epoxy hardener compounds to be formed from epoxy hardener precursor in the epoxy based two-component aerosol paint and adhesive system, without affecting negatively to the quality of the paint to be manufactured from said aerosol formulation.

This second main objective means that method to be used should enable making a wide range of paints with high gloss, lacquers or varnishes with high transparency, adhesives and primers with good adhesion and paints with good surface hardness, all these without using water scavengers.

Yet, a further object of the present invention is to provide an aerosol formulation comprising an epoxy resin and adhesive system for use in a single chamber aerosol can, which formulation is stable for a long time period enabling successful reuse after initial first usage anytime within at least a year.

In the following hardener compounds have also mentioned as epoxy hardener compounds which will cause curing of epoxy resins in the presence of atmospheric moisture.

The present invention provides a method for preventing hardener compounds to be formed from hardener precursors and an aerosol formulation as depicted by the claims.

To be more accurate the present method relate to a method for preventing hardener compounds to be formed from hardener precursors in an aerosol formulation suitable for use in an aerosol can for making a paint or an adhesive, wherein said aerosol formulation is prepared by adding into said can following compounds:

paint forming chemicals comprising an epoxy resin and an epoxy hardener precursor;

a weak acid and a possible solvent; and mixing said paint forming chemicals, weak acid and possible solvent to obtain a mixture before or after adding aid compounds into said can, to obtain a mixture. In said method the weak acid (XCOOH) is added a catalytic amount, wherein said weak acid is selected from the group in which have the dissociation constant pKa value in the range from 1.2 to 5.2 to shift, in the presence of (free) water and ketone, the reaction balance between epoxy hardener precursor and epoxy hardener amines to favour the formation of epoxy hardener precursors according to reaction (2a):

(2a)

so that formation of epoxy hardener compounds is prevented from said epoxy hardener precursors, wherein said epoxy hardener precursors, are selected from the group composing of: an imine, an enamine, a Mannich base, an aldimine and mixtures thereof.

In a case the epoxy hardener precursor is imine the reversible hardener precursor reaction with water results an amine and a ketone. In the presence of weak acid such as carboxylic acid or carbonyl acid, this reaction is shifted to favour the formation of imines instead of amines, thus preventing formation of amine hardeners of epoxy resin as follows:

Amine (epoxy hardener)+ketone→Imine+$H_2O$ (2a)

If the epoxy hardener precursor is Mannich base hardener the reversible Mannich base hardener precursor reaction with water results in an amine and a ketone. The presence of weak acid such as carboxylic acid or carbonyl acid shifts this reaction equilibrium to the hardener precursor side thus preventing formation of these amine hardeners of epoxy resin as presented in reaction (22a)

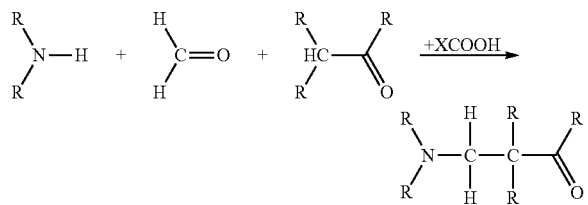

In the preferred embodiment of the present invention the aerosol formulation is prepared by mixing paint forming chemicals comprising an epoxy resin and a hardener precursor; a weak acid and a possible solvent for obtaining a mixture; directing the obtained mixture into a single chamber aerosol can, and providing the propellant into the can; and sealing the can.

The method of the present invention can also be realized by adding at least one of paint forming chemicals comprising the epoxy resin and the epoxy hardener precursor into separate sealable compartment(s) inside the can; adding a weak acid and a possible solvent into said can; and providing the propellant into the can; sealing the can; and mixing together paint forming chemicals, weak acid an a possible solvent inside a room of the can before the use.

The present invention relate also an aerosol formulation suitable for use in can for making a paint or an adhesive, wherein said aerosol formulation have been prepared by either by a) providing a mixture of paint forming chemicals by mixing an epoxy resin and an epoxy hardener precursor and admixing weak acid and possible solvent into said mixture; directing said mixture into a aerosol can; sealing the can; and providing the propellant into said can or b) adding paint forming chemicals comprising an epoxy resin and an epoxy hardener precursor; and weak acid; and possible solvent into an aerosol can; sealing the can; and providing the propellant into said can; mixing an epoxy resin and an epoxy hardener precursor and admixing weak acid and possible solvent inside the can. In the formulation:

epoxy hardener precursors, are selected from the group consisting of an imine, an enamine, a Mannich base, aldimine and mixtures thereof;

weak acid is selected from the group which have the dissociation constant pKa value in the range from 1.2 to 5;

the prepared aerosol formulation contains a catalytic amount of weak acid which is from 0.1 to 5% by weight (w/w) of the aerosol formulation, preferably from 0.1 to 3%, still more preferably from 0.5 to 2%.

The present invention is based on the surprising finding that a stable aerosol formulation comprising epoxy resin and adhesive formulation, can be prepared and packed into a conventional aerosol can having a common chamber for a mixture of epoxy resin and adhesive formulation or part of it, if a catalytic amount of weak acid is added into can, which will create a weak acid environment inside the aerosol can.

The weak acid environment will enable making a stable mixture of the components without a chemical reaction taking place between the components of said hardener precursor and said adhesive formulation or weak acid. Adding a catalytic amount of weak acid which have the dissociation constant pKa value in the range from 1.2 to 5.2, enables formulation components to contain minor amounts of water originating from the transport, preparation or handling of the chemicals and containers. The weak acid is selected so, that it will efficiently maintain the equilibrium of the formulation at the hardener precursor's side even at the presence of minor amounts of water (under 2000 ppm, preferably under 600 ppm).

In the present invention the reversible balance reaction (1c) is thus controlled by creating weak acid environment, which will drive reaction to favour formation of hardener precursors according to reaction (2a) without scavenging or removing water molecules.

Thus, the effect of water into formation of amines (an epoxy hardener compound) from mentioned epoxy hardened precursors is controlled totally by using a weak acid as a catalyst to force the balance reaction (1c) to proceed via pathway of reaction 2a without removing the water created in the condensation reaction (1c) between ketone and amine. In the case hardener precursor is an imine, the presence of weak acid favours the formation of imines instead of amines when ketone and water are present. This same basic principle will allow more water to be present in said aerosol formulation without amine (epoxy) hardener compounds to be formed from its (epoxy) hardener precursors, wherein (epoxy) hardener precursor can be also aldimine, enamine or Mannich bases instead of imine.

It is important to keep the amount of the weak acid so small that it will not have any negative influence on the quality of the coating. The weak acid is needed only a catalytic amount in the present method. This catalytic amount of a weak acid means that there is 0.1 to 10% of weak acid by weight (w/w) of the aerosol formulation, preferably from 0.2 to 5%, more preferably from 0.5 to 2% of weak acid by weight (w/w) of the aerosol formulation.

Preferably, all components of the aerosol formulation can be placed within a common single chamber in an aerosol can without the components essentially reacting with each other during storing.

In a method of the present invention said method further comprises spraying the aerosol formulation out from the can to form a paint layer on the target surface.

In another method of the present invention said method further comprises reusing said aerosol formulation comprising the mixture of paint forming chemicals comprising an epoxy resin and an epoxy hardener precursor; a weak acid and a possible solvent after storing said mixture an extended time period of 0.5-3 years.

The use of catalytic amount of weak acid in the present method and the aerosol formulation used in this method enables making high quality paints regardless if all of is used at once or reused after an extended time period The dry paint film (undercoat, finishing coat or lacquer) prepared from said mixture should have gloss in the range of 10-100 preferable over 90, under an angle of 60°.

The dry paint film prepared from said mixture should have the König-hardness over 40 after 10 h and over 100 after 120 h of drying-time, measured with pendel hardness meter.

The dry paint film prepared from said mixture should have the adhesion >450 psi, in PosiTest.

The definition aerosol can means herein that inside the aerosol can there is a room wherein at least part of the epoxy resin based paint and adhesive system, such as epoxy resin and hardener precursor, co-exist as a mixture for extended time period of storing.

The paint means herein, primer, undercoat, finishing coat, top coat, coloured top coat, varnish or lacquer.

In the present invention by hardener or epoxy hardener is meant a chemical compound capable of acting as a hardener for an epoxy resin such as an amine that is formed when the hardener precursor such as imine, enamine, aldimine and/or Mannich base reacts with water. The hardener of the present invention is able to react with the epoxy resin used for providing the desired coating layers i.e. paint or adhesive.

In the present invention by hardener precursor or epoxy hardener precursor is meant a chemical compound capable of forming an (epoxy) hardener i.e. containing the suitable amine produced by a chemical reaction.

In the present invention by a weak acid is meant an acid that dissociates incompletely, releasing only some of its hydrogen atoms into the solution.

The aerosol formulation may even be prepared under ambient conditions without any particular need for predrying the components of aerosol formulation beforepacking them into aerosol can or operating under inert gas, such as nitrogen, atmosphere while preparing the formulation from its components or filling the can. Even technical grade or industrial quality components comprising hardener precursors may be used although they provide water into the formulation inside the can.

The stable mixture of the epoxy resin and the epoxy hardener precursor and the weak acid, together with at least one propellant, is packed as an aerosol formulation into a conventional one-chamber aerosol can. As the aerosol formulation comprising epoxy resin and hardener precursor is sprayed from the can, a cloud of fine particles suspended in gas or air is formed picking up water (moisture) from the air. The absorbance of water will have an effect on the hardener precursor, such as imine, enamine, aldimine and/or Mannich base compound. With the relatively overload of water present in the atmospheric air, the hardener precursor will hydrolyze and form an amine that will react with the epoxy binder and create a cross linking film. Together with the other paint/adhesive related ingredient this will form the eventual end product (paint) which can be an adhesive, a colored top coat, a varnish, lacquer, a primer or a clear coat.

As the reaction between the amine compound and the epoxy resin occurs outside of the aerosol can, the formulation inside the can stays stable. No additional moisture from the air gets inside the can, because pressure inside the can is greater than the pressure outside of the can.

As the formulation stays stable inside the can, only a desired portion of the two-component aerosol formulation may be used at a time. That is, the whole formulation does not have to be used at once, since the formulation remains stable inside the can. Shelf life of the can containing the formulation is at least a year, possibly up to 3 years or even more. Moreover, an aerosol can containing the formulation is easier and faster to use, because there is no need to first separately mix the hardener and the binder as is the case with known solutions.

The preparation of the formulation and can containing the formulation is essentially simplified as no protection gas or predrying steps are necessary. The manufacturing can take place in ambient conditions using regular mixing and can filling techniques.

By ambient is meant the typical environmental conditions, temperature, pressure and humidity, prevailing at the point of preparation of the formulation at regular industrial surroundings.

As said before a weak acid is an acid that dissociates incompletely, releasing only some of its hydrogen atoms into the solution.

Thus, it is less capable than a strong acid of donating protons. Weak acids ionize in water solution only to a moderate extent. If the weak acid is represented by the general formula HA, then in an aqueous solution a significant amount of undissociated HA still remains. Weak acids dissociate in water in the following way:

$$HA_{(aq)} \rightleftharpoons H^+_{(aq)} + A^-_{(aq)}$$

The strength of a weak acid may be represented by an equilibrium constant or percentage of dissociation. The equilibrium concentrations of reactants and products are related by the acid dissociation constant, $K_a$:

$$K_a = \frac{[H^+][A^-]}{[HA]}$$

The greater the value of $K_a$, the more the formation of H+ is favored, and the lower the pH of the solution. The $K_a$ of weak acids typically varies between 1.8×10-16 and 55.5. For many practical purposes it is more convenient to discuss using the logarithmic constant, $pK_a$ $$pK_a = -\log_{10} K_a$$

A weak acid typically has a pKa value within the approximate range from −2 to 12 in water.

In one aspect, the present invention provides a two-component aerosol formulation suitable for use in an aerosol can, such as in a single chamber aerosol can. Naturally, also multiple chamber cans can be used, in a case paint forming chemicals, comprising epoxy resin and a hardener precursor,
  a weak acid and a possible solvent for obtaining a mixture;

the components are brought into contact with each other once taking the can into use.

More particularly, the present invention provides a two-component aerosol formulation containing paint forming chemicals comprising at least one epoxy resin and at least one hardener precursor, and at least one propellant. The formulation further contains at least a portion of a weak acid having the dissociation constant pKa value in the range from 1.2 to 5.2.

In one embodiment the weak acid is selected from those having the dissociation constant pKa value within the range from 3 to 5, for efficiently maintaining the equilibrium of the formulation at the hardener precursor's side.

In another embodiment the weak acid is selected from those having the dissociation constant pKa value within the range from 4.2 to 4.9 for optimized stability in storage and performance in use.

Naturally, the type of weak acid has a further influence on the formulation properties, as well as the amount of weak acid used.

In the formulation of the present invention, the epoxy resin does not substantially react with the hardener precursor or with the weak acid of the aerosol formulation when in a mixture inside the can i.e.

In one embodiment, the epoxy resin is selected from the group consisting of bisphenol A epoxy resin, bisphenol F epoxy resin, novolac epoxy resin, aliphatic epoxy resin, glycidylamine epoxy resin, and mixtures thereof.

In one embodiment, the epoxy resin is bisphenol A epoxy resin. The bisphenol A epoxy resins are formed from reacting epichlorohydrin with bisphenol A. For example, the simplest bisphenol A epoxy resin is formed from reacting two moles of epichlorohydrin with one mole of bisphenol A to form bisphenol A diglycidyl ether (DGEBA). Increasing the ratio of bisphenol A to epichlorohydrin during manufacture produces higher molecular weight polyethers with epoxide groups (also referred to as glycidyl groups). This binder is particularly suitable for regular conditions. It has good water resistance and chemical resistance, and it provides flexible coatings.

In one embodiment, the epoxy resin is bisphenol F epoxy resin. The bisphenol F epoxy resins are formed from reacting epichlorohydrin with bisphenol F in similar way to bisphenol A. This binder has better chemical resistance compared to bisphenol A epoxy resins, especially at low and high pH ranges.

In one embodiment, the epoxy resin is novolac epoxy resin. The novolac epoxy resins are formed from reacting phenols with formaldehyde and subsequent glycidylation with epichlorohydrin. Examples of particularly suitable novolac epoxy resins are epoxy phenol novolacs (EPN) and epoxy cresol novolacs (ECN). These provide high chemical resistance together with a high temperature resistance. The formed films are less flexible when the epoxy group content is increased.

In one embodiment, the epoxy resin is aliphatic epoxy resin. The aliphatic epoxy resins comprise glycidyl epoxy resins and cycloaliphatic epoxides. These materials may act as dilutants, as well. They are preferably applied as auxiliary resins to the above discussed primary resins.

In one embodiment, the epoxy resin is glycidyl epoxy resin. The glycidyl epoxy resins are formed by reaction of epichlorohydrin with aliphatic alcohols or polyols to give glycidyl ethers or aliphatic carboxylic acids to give glycidyl esters. Examples of preferred glycidyl epoxy resins are dodecanol glycidyl ether, diglycidyl ester of hexahydrophthalic acid, and trimethylolpropane triglycidyl ether. The purpose of these chemicals is to provide a reactive dilutant for its low viscosity. Preferably, they are used in combination with the primary resins as auxiliary binders to balance the reaction taking place. Typically, their reaction rate is clearly lower to the primary resins.

In one embodiment, the epoxy resin is cycloaliphatic epoxide. The cycloaliphatic epoxides contain at least one cycloaliphatic ring in the molecule to which an oxirane ring is fused. The cycloaliphatic epoxides are formed by reaction of cyclo-olefins with a peracid, such as peracetic acid. An example of preferred cycloaliphatic epoxide is 3,4-epoxy-cyclohexylmethyl-3,4-epoxycyclohexane carboxylate. The purpose of these chemicals is to provide a reactive dilutant for its low viscosity. The reaction rate is lower to the primary resins.

In one embodiment, the epoxy resin is glycidylamine epoxy resin. The glycidylamine epoxy resins are formed when aromatic amines are reacted with epichlorohydrin. Examples of preferred glycidylamine epoxy resins are tri-glycidyl-p-aminophenol and N,N,N,N-tetraglycidyl-4,4-methylenebis benzylamine. These provide a very high temperature resistant coating and very high reactivity, as there as many epoxy groups in the chain.

In one embodiment a combination of selected different types of primary and auxiliary resins, and optional solvents, is used to ensure linear and steady evaporation of the solvents, and to enhance the forming of the coating and exhibiting desired properties.

A wide range of different epoxy resins, such as the ones mentioned above, are produced industrially and are commercially available.

The epoxide content is a characteristic feature of the epoxy resins. The epoxide content is commonly expressed as epoxide number, which is the number of epoxide equivalents in 1 kg of resin (Eq./kg), or as the equivalent weight, which is the weight in grams of resin containing 1 mole equivalent of epoxide (g/mol). One measure may be converted to another with formula:

$$\text{Equivalent Weight (g/mol)} = 1000/\text{epoxide number (Eq./kg)}$$

Preferably, the epoxy resin of the present invention is selected from a group consisting of bisphenol A epoxy resin, bisphenol F epoxy resin, epoxy phenol novolacs (EPN), epoxy cresol novolacs (ECN), dodecanol glycidyl ether, diglycidyl ester of hexahydrophthalic acid, trimethylolpropane triglycidyl ether, 3,4-epoxycyclohexylmethyl-3,4-epoxycyclohexane carboxylate, triglycidyl-p-aminophenol, N,N,N,N-tetraglycidyl-4,4-methylenebis benzylamine, or mixtures thereof. More preferably, the epoxy resin of the present invention is selected from bisphenol A epoxy resin or bisphenol F epoxy resin. The characteristics of these two types of binders are the most suitable for the aimed products. They further enable the use of reactive diluents of high temperature resistant type.

In one embodiment, the epoxy resin has an Equivalent Weight from 100 to 1500 g/eq, preferably from 120 to 700 g/eq, and more preferably from 450 to 500 g/eq.

In another embodiment the epoxy resin is an epoxy with an epoxy group content of 2000-2220 mmol/kg and an epoxy molar mass of 450-500 g/Eq.

In one embodiment the amount of epoxy by weight of the formulation is from 18 to 30%. Preferably, the amount of epoxy by weight of the formulation is from 15% to 30%. Most preferably, the amount of epoxy by weight of the formulation is from 15 to 23%

The aerosol formulation of the present invention comprises at least one hardener precursor which is preferably selected from the group consisting of an imine, an enamine, a Mannich base, aldimine and mixtures thereof.

The imine which can also be an a Schiff's base, enamine, aldimine or Mannich base do not substantially react with the epoxy resin as such, when no water is present, for example inside a dry aerosol can atmosphere. As soon as the imine, enamine, aldimine and/or Mannich base are in contact with water, the water reacts with the hardener precursor, and as a result of this reaction an amine reactant is formed. Subsequently, the formed amine compound functions as hardener and reacts with the epoxy resin providing the coating.

When the two-component aerosol formulation of the present invention is sprayed from an aerosol can, a cloud of particles suspended in gas or air is formed effectively picking up moisture from the air due to large surface area. The moisture or water will react with the hardener precursor of the formulation forming the amine compound (a hardener). The formed amine compound reacts further with the epoxy resin. This reaction is also referred to as curing reaction. And, finally a coating or adhesive layer is formed on a substrate on which the formulation is sprayed.

FIG. 1 presents, as an example, the reversible reaction of an imine with water resulting in an amine and a ketone:

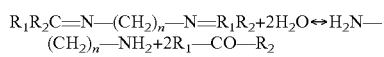

FIG. 1.

FIG. 2 presents, as an example, the reversible reaction of an enamine with water resulting in an amine and a ketone:

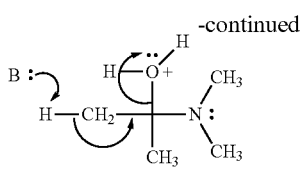

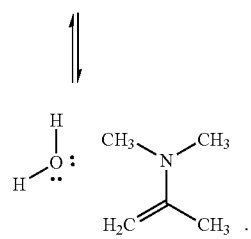

Mannich reaction is an organic reaction which consists of an amino alkylation of an acidic proton placed next to a carbonyl functional group by formaldehyde and a primary or secondary amine or ammonia. The final product is a n-aminocarbonyl compound also known as a Mannich base. Reactions between aldimines and α-methylene carbonyls are also considered Mannich reactions because these imines form between amines and aldehydes.

The Mannich reaction is an example of nucleophilic addition of an amine to a carbonyl group followed by dehydration to the Schiff base.

FIG. 3 presents, as an example, a reversible reaction of a Mannich base with water resulting in an amine and a ketone:

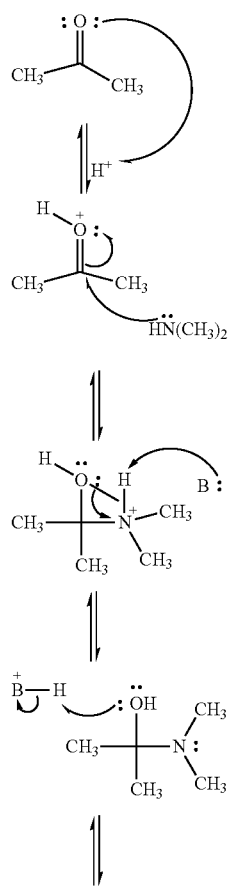

FIG. 2

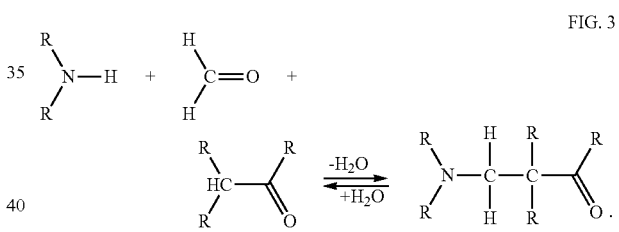

FIG. 3

In the present invention, the imine, enamine, aldimine and Mannich base are selected in a way that they react with water by forming an amine. Additionally, the imine, enamine, aldimine and Mannich base are selected in a way that that they do not substantially react with the epoxy resin or other components inside an aerosol can.

In one embodiment, the formed amine is primary, secondary or tertiary amine.

In one embodiment, the formed amine is mono-, di- or polyfunctional amine.

In one embodiment, the formed amine is aliphatic, cycloaliphatic or aromatic amine.

Preferred amines are di- and polyfunctional primary amines. The di- and polyfunctional primary amines undergo a reaction with an epoxide group of the epoxy resin to form a hydroxyl group and a secondary amine. The secondary amine can further react with an epoxide group to form a tertiary amine and an additional hydroxyl group.

In one embodiment the imines are reaction products of ethylenediamine and methyl isobutyl ketone; diethyl ketone-based di-imine, preferably N,N'-di(1-ethylpropylidene)-m-xylylenediamine, or mixtures thereof. Ethylenediamine and m-xylylenediamine are very good hardeners for epoxy coatings without side effects like Bernard cells and blushing. The solvent formed after hydrolysing the imine is compatible with the reaction product. The amine hydrogen equivalent weight (ANEW) values are in the dosage range of about 1:10 of binder.

In another embodiment enamine is a reaction product of 3,3,5-trimethylcyclohexanone with secondary diamines; a reaction product of isopheronediamine and methyl isobutyl ketone; N,N, bis(1,3-dimethylbutylidine)ethylenediamine. The diamines give a higher reactivity than monoamines and provide therefore a faster hardening that can lead to a harder film but less flexible film formation.

In one embodiment aldimine is any Schiff base of the general formula RCH—NH or RCH—NR' formed by condensation of an aldehyde with ammonia or a primary amine. Preferred aldimines are N-butyl-2-(1-ethylpentyl)-1,3-oxazolidine or 3-Oxazolidineethanol,2-(1-methylethyl)-,3,3-carbonate.

A wide range of imines and Mannich bases are commercially available. Also enamines and aldimines are commercially available. Suitable imines, enamines, aldimines and Mannich bases can also be synthesized with known procedures.

In one embodiment Mannich base is the reaction product between an aldehyde, such as formaldehyde, and a secondary amine, such as diethanol amine, in a weak acid environment dissolved in organic solvent, such as methyl ethyl ketone, as depicted by FIG. 4:

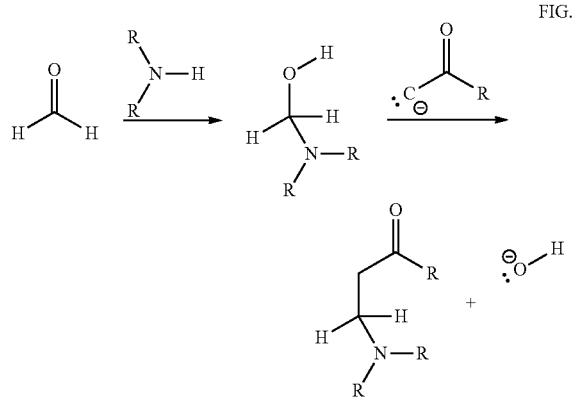

FIG. 4

In yet another embodiment the Mannich base is Ancamine 1110 (Airproducts) i.e. dimethylaminomethylphenol as active ingredient, as depicted by FIG. 5:

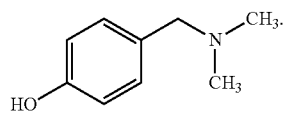

FIG. 5

In yet another embodiment the Mannich base is selected from D.E.H™ 613, D.E.H™ 614, D.E.H™ 615, D.E.H™ 618, D.E.H™ 619 and D.E.H™ 620, or mixtures thereof, available commercially from company DOW.

The weight ratio between the epoxy resin binder to the hardener precursor is based on the epoxy molar mass of the binder and the equivalent weight of the hardener precursor, the amine content of the hardener precursor. The amount of hardener may vary +/−10%.

In one embodiment weight ratio of the epoxy resin to hardener precursor is from 8:1 to 15:1, preferably from 9:1 to 12:1, more preferably from 10:1 to 11:1 when using the preferred resins and hardener precursors.

In one embodiment the epoxy resin is an epoxy binder with an epoxy molar mass of 450-500, and the hardener precursor is a reaction product of ethylenediamine and methyl isobutyl ketone.

The two-component aerosol formulation of the present invention may further comprise at least one solvent, sometimes also referred to as diluent. Function of the solvent is to lower the viscosity of the epoxy resin and the hardener precursor. The solvent type and the amount of the solvent are selected in a way that the viscosity of the epoxy resin and the hardener precursor mixture is such that the mixture is viscous enough to be suitably sprayed with aid of the propellant from a regular aerosol can.

The solvent is preferably selected from a group consisting of ketones, acetates, glycol ethers, aromatic solvents, aliphatic solvents, or mixtures thereof. More preferably, the solvent is dimethyl ketone, methyl iso-butylketone, methyl ethyl ketone, xylene, 1-methoxy-2-propanol, di-propylene glycol methyl ether cyclohexanone, or mixtures thereof.

Viscosity of liquid phase of the formulation is preferably from 50 to 300 cSt, more preferably from 50 to 150 cSt, measured at 20° C. and at atmospheric conditions. By the liquid phase is meant mixture of the epoxy resin and the hardener precursor, and optionally the solvent.

The propellant may be any suitable propellant known in the art. Preferably, the propellant is selected from a group consisting of dimethyl ether, propane, butane, isobutene, nitrogen, dinitrogen oxide, 1,1,1,2-tetrafluoroethane, or mixtures thereof. Most preferably, the propellant is dimethyl ether.

The two-component aerosol formulation may further comprise any additional suitable additives, such as colorants, color pigments and curing accelerators. Preferred colorants and color pigments are iron(II)oxide, iron(III) oxide, phatalo green, titanium(II)oxide and carbon black.

The epoxy resin, the imine, the enamine, the aldimine and the Mannich base, the solvent, the propellant and any additional additives typically need to be totally water free. In the present invention, due to the addition of a weak acid into the formulation, this requirement is not that strict. The precursors may suitably be water free but the formulation of the present invention tolerates a moderate amount of water present.

In one embodiment, the formulation further contains water. The amount of water is preferably less than 2500 ppm, more preferably less than 2000 ppm, usually less than 600 ppm. In moist ambient the water content included into a formulation from surrounding atmosphere may be up to 250 ppm depending on the temperature and relative humidity. Whereas, the varying grade of precursors used may carry considerably more water into the formulation without using any pre-treatment, such as up to 2000 ppm.

It was found by the inventors that the reversible Mannich base hardener precursor reaction with water discussed above resulting in an amine and a ketone may be modified using an addition of a weak acid into the reaction mixture. When a weak acid, such as carboxylic acid or carbonyl acid is present, the reaction equilibrium is shifted towards the hardener precursor side as shown in FIG. 6 for reaction 22a:

Reaction 22a

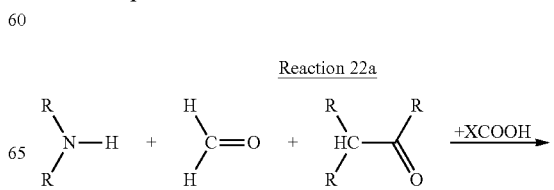

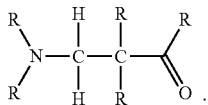

Now the reaction balance favours the presence of the hardener precursor instead of the amine formation. By adjusting the amount, and type, of the weak acid to be added, the equilibrium of the amine formation reaction can be adjusted to favour the presence of the hardener precursor. The amount of weak acid depends on the pKa value of the acid.

When the amount of water increases considerably i.e. the ejected droplets of the formulation aerosol spray having a very small particle size, 75-100 micrometer, are exposed to environmental conditions and subjected into contact with ambient humidity the equilibrium will eventually shift to favour the formation of the amine. Moreover, the evaporation of the weak acid will further favor the reaction towards the forming of the amine which will enhance the reaction with the epoxy groups of the binder.

Preferably, the weak acid is selected from the group consisting of carboxylic acids and carbonic acids.

In one embodiment the weak acid to be applied comprises formic acid (methanoic acid) HCOOH (pKa=3.8), acetic acid (ethanoic acid) $CH_3COOH$ (pKa=4.7), propionic acid (propanoic acid) $CH_3CH_2COOH$ (pKa=4.9), butyric acid (butanoic acid) $CH_3CH_2CH_2COOH$ (pKa=4.8), valeric acid (pentanoic acid) $CH_3CH_2CH_2CH_2COOH$ (pKa=4.8), caproic acid (hexanoic acid) $CH_3CH_2CH_2CH_2CH_2COOH$ (pKa=4.9), oxalic acid (ethanedioic acid) (COOH)(COOH) (pKa=1.2), lactic acid (2-hydroxypropanoic acid) $CH_3CHOHCOOH$ (pKa=3.9), malic acid (2-hydroxybutanedioic acid) $(COOH)CH_2CHOH(COOH)$ (pKa=3.4), citric acid (2-hydroxypropane-1,2,3-tricarboxylic acid) $CH_2(COOH)COH(COOH)CH_2(COOH)$ (pKa=3.1), benzoic acid (benzenecarboxylic acid or phenylmethanoic acid) $C_6H_5COOH$ (pKa=4.2) or carbonic acid (hydroxymethanoic acid) OHCOOH or $H_2CO_3$ (pKa=3.6). Preferably, the weak acid is acetic acid, benzoic acid, propionic acid or mixtures thereof, as these are the most efficient weak acids for the preferred hardener precursors of the present invention.

In one embodiment the weak acid is propionic acid, having a high pKa value.

In another embodiment the weak acid is acetic acid. Acetic acid has the advantage that it is a volatile liquid which readily evaporates when sprayed.

In yet another embodiment the weak acid is benzoic acid. This acid is a solid which facilitates the handling in preparation.

The amount of acid is dependent on the pKa value of the acid, the higher the pKa, the less acid is required.

Preferably, the amount of the weak acid to be added into the formulation of the present invention is from 0.1 to 10% by weight (w/w) of the two-component aerosol formulation, preferably from 0.2 to 5.0%, more preferably from 0.5 to 2.0%. The amount of weak acid used depends on the type of acid, the pKa value, and the selected hardener precursor.

In one embodiment the formulation according to the present invention contains 8-45%, preferably about 20% by weight epoxy binder with an equivalent weight of 120-800, preferably 475, which is preferably a bisphenol epoxy binder; and 1.5-35% by weight, preferably about 3.2% by weight of the hardener, which is preferably the reaction product of isophoronediamine and methyl isobutyl ketone; and 10-30% by weight, preferably about 18.3% by weight solvent, which is preferably 1-methoxy-2-propanol; and 10-30% by weight, preferably about 16.8% by weight of additional solvent, which is preferably butanon-2; and 0.5-3% by weight, preferably about 1.7% of the weak acid, which is preferably acetic acid; and 25-45% by weight, preferably about 40% by weight propellant, which is preferably dimethyl-ether. This composition is especially well suited as fuel, water and chemical resistant clear coat.

In a further aspect, the present invention provides a method for producing a two-component aerosol formulation as depicted above wherein the formulation is prepared under ambient conditions. The method further provides for increasing the storage stability and shelf life of a two-component aerosol formulation when stored in a single chamber aerosol can.

By ambient conditions is meant regular environmental conditions typically comprising water vapour the amount dependent on the temperature and humidity, and water originating from precursor chemicals.

Typically, the stability without the acid and when prepared at water-free conditions using water-free precursors is about a few weeks or months. And especially, if traces of water remain in the can the stability of the formulation decreases rapidly. The formulation of the present invention is stable at least over a year, with preferred choice of precursors at least up to 3 years. The can may be reused several times without any decrease in the storage stability.

Moreover, in the method of the present invention the preparation of the formulation may be performed under ambient conditions simplifying the manufacturing considerably as no protection gasses or drying agents need to be applied. No nitrogen atmosphere is necessary to avoid excess water contamination. In the preparation method according to the present invention merely a weakly acidic formulation is created by adding a suitable small amount of weak acid thus preventing immediate reactions of the hardener precursors with moisture.

In one embodiment the formulation of the present invention is prepared by first mixing the coating forming chemicals comprising the epoxy resin and the hardener precursor, and the weak acid having the dissociation constant pKa value in the range from 1.2 to 5.2. The obtained mixture is directed into a single chamber can. Subsequently, the propellant is introduced into the can, and the can is sealed, and ready for use.

In one embodiment, when the coating forming chemicals comprise an auxiliary resin or solvent, the weak acid is first dissolved into the solvent, auxiliary resin or mixture thereof, after which at least one resin builder i.e. primary resin is introduced into this mixture. Subsequently, at least one hardener precursor is introduced thereto.

In one embodiment, the solvents, if more than one, are first mixed together. Subsequently, the acid is introduced and mixed with the solvents. The primary, and optionally, the auxiliary resin builder(s) are introduced into the mixture, whereafter the hardener precursor(s) is introduced.

Preferably, after introducing all the compounds of the coating forming chemicals into the formulation, it is mixed for a short period, such as 15 min per 1000 I of formulation, prior to directing the mixture into cans and sealing the cans. Excess exposure to ambient should be avoided, if possible.

In a yet further aspect, the present invention provides an aerosol can containing the two-component aerosol formulation discussed above.

The mechanical vessel, the aerosol can, also referred to as a spray can or an aerosol spray can, may be any conventional aerosol can known in the art.

Preferably, the aerosol can is a conventional aerosol can having one single chamber.

The aerosol can be a 2-chamber aerosol can, commonly used for two-component aerosol formulations. In the 2-chamber aerosol can the hardener precursors are in one chamber and the epoxy resin in a separate chamber. In this case the hardener precursors and epoxy resin are united in a room inside the can where weak acid environment is present. When united hardener precursors and epoxy resin can stay for a prolonged time in said room without epoxy hardener compounds being formed.

In the aerosol can having a single chamber all components of the formulation are in the same chamber. Examples of single chamber aerosol cans are straight-walled and necked-in cans.

Material of the aerosol can is metal based, for example, aerosol can is made of aluminium or tinplate.

Aerosol cans are commercially available in a diversity of diameters, heights, fill volumes, brim volumes and pressures. As for the shape, there is a wide range of variations available.

Special provisions apply for, especially metal, aerosol cans. These provisions are well known for a skilled person in the art. The special provisions define, for example, total capacities of aerosol cans, pressures of the aerosol cans, volume of liquid phase etc.

An example of such provision is, in Europe, "The Pressure Equipment Directive" (97/23/EC) together with: the directives related to simple pressure vessels (2009/105/EC), transportable pressure equipment (99/36/EC), and Aerosol Dispensers (75/324/EEC); for an adequate legislative framework on European level for equipment subject to a pressure hazard.

Aerosol cans are commercially available, for example from company G. Staehle GmbH u. Co. KG, Germany.

In one embodiment the aerosol may additionally contains one or several mixing balls, preferably two mixing balls, which enhance mixing of the two-component aerosol formulation when the can is shaken before spraying. The mixing balls, also referred to as shaking balls or peas, are well known and commonly used in the art.

The two-component aerosol formulation of the present invention can be packed into an aerosol can with known procedures.

In one embodiment, first an epoxy resin, weak acid and solvent are mixed together. Optionally, color paste or other additives are added to the mixture and the mixing is continued. The hardener precursor is added to the mixture and mixing is continued. The obtained mixture is filled in a 1-chamber aerosol can with a liquid filling machine. Shaking balls may be added, a valve is put on the can and clinched on the can. The can is finally filled with a suitable amount of liquefied propellant through the valve. An actuator is put on the valve, and the can is ready to be used. All these procedures may be performed under ambient conditions.

The valve may be any common aerosol can valve used in the art. Suitable aerosol can valves are commercially available, for example from company Aptar GmbH, Germany.

The actuator may be any common actuator used in the art. Suitable actuators are commercially available. Example of such actuator is Aptar W2AX from company Aptar GmbH, Germany.

In addition to the weak acid application, the time between mixing and filling the formulation into an aerosol should be kept as short as possible in order to avoid unnecessary water contamination.

In one embodiment the precursor chemicals are treated for removal of excess water prior to application into the formulation.

When the two-component aerosol formulation is sprayed from an aerosol can there should be a sufficient amount of water, such as humidity, present in the surrounding environment for the hardener precursor to react efficiently with the water to form the amine.

Preferably, the temperature of the environment during the spraying should be such that the two-component aerosol formulation is viscous enough to be sprayed. More preferably, the temperature is from 10 to 50° C., most preferably from 15 to 35° C., and even such as from 17 to 27° C.

In one embodiment the two-component aerosol formulation is used in underwater applications. The pressure inside the can is adjusted to overcome the ambient pressure. Preferably, water displacement additives are used to ensure sufficient contact of the paint spray to the surface to be coated.

The epoxy resin and/or formed amine combinations cure at ambient temperature. In one embodiment the curing is expedited by heating, with temperatures up to 75° C.

Spray pattern, when the aerosol formulation is sprayed from an aerosol can, is a fine mist of aerosol droplets forming a film on sprayed surface. The spray pattern can be flat, such as fan spray, or round depending on the actuator.

In one embodiment, the spray will give a dry film of approx. 15-20 μm after 1 cross layer, with a hardness of persoz hardness at least 180 sec. The coating layer is dust dry after 15 min, touch dry after 30 min, and sufficient hardened after 24 h.

More particularly, there is provided use of the aerosol can as defined above for applying coatings and adhesives.

In one embodiment, the two-component aerosol formulation of the present invention and the method for preparation thereof is used for providing a clear coat.

In one embodiment the aerosol can is used for spraying undercoats, finishing coats, top coats, primers, coloured coats, varnishes, lacquers or adhesives.

The aerosol can may be used to spray high quality adhesives, primers, undercoats, top coats, finishing coats, coloured coats, varnishes or lacquers in any suitable applications, such as industrial, automotive, marine, construction industry and/or flooring applications.

The following non-limiting examples will further illustrate the present invention.

EXAMPLES

Example 1

A two-component aerosol formulation is prepared for production of approx. 625 aerosol cans with filling of 400 ml.

Formulation

Component 1: Epikote 1001-x-75 (epoxy resin in xylene); 113.7 kg; from company Momentive Specialty Chemicals, Netherlands.

Component 2: Epicure 3502 (hardener precursor: reaction product of ethylenediamine and methyl isobutyl ketone); 9.3 kg; from company Momentive Specialty Chemicals, Netherlands.

Component 3: Methylethyl ketone; 7.8 kg; from company Brenntag Nordic Oy, Finland.

Component 4: Xylene; 23.6 kg; from company Brenntag Nordic Oy, Finland.

Component 5: Dimethyl ether; added per can 96.6 g; from company Dupont de Nemours, Netherlands.

Component 6: acetic acid, 6.86 g; about 2% by weight; from Taminco

Mixing and Filling

To a 200 l barrel were added components 1, 6, 3 and 4, in this order, under ambient conditions. The mixture was mixed with a normal mixer (not high shear) for less than 15 minutes. Component 2 was added to the mixture and it was mixed for further 15 minutes until the mixture was homogeneous and did not separate.

A three piece tinplate aerosol can (a 1-chamber aerosol can) without inner coating was used. Dimensions of the can were: diameter 65 mm; height 157 mm; 400 ml filling (520 ml brimful volume). Supplier for the can was G. Staehle GmbH u. Co. KG, Germany.

Two mixing balls were added to the can and the can was filled with 247.1 g of the prepared mixture containing components 1, 6, 3, 4 and 2 with a liquid filling machine.

An aerosol valve (commercially available from Aptar GmbH, Germany) was put on the can. Specifications of the valve were: Aptar: cup tinplate, stem 0.50 mm, housing 2.4 mm, VPH 0.45 mm, inner gasket: chlorobutyl, outer: gasket n-buna sh 85.

The valve was clinched on the can and the clinch was checked with clinch measurement equipment from company Kroeplin, Weith 27.2 mm, Depth 5.10 mm.

The closed can was filled with liquefied propellant dimethyl ether (component 5) 96.6 g. An actuator (Aptar W2AX from company Aptar) was put on the valve, after which the can filled with the formulation was ready for use.

Visual Testing

One cross layer of the formulation was sprayed on a white metal paint card having a black stripe.

Observations:

The layer was dust dry in 18 minutes.

The layer was touch dry in 35 minutes.

Transparencies of clearcoat, Carder ASTM 1544<1.

No dripping after spraying one cross layer wet in wet.

Dry Film Thickness

Film thickness of one cross layer was measured after 1 h drying time. The film thickness was measured with BYKO-Test MPOR from company BYK. Thickness of the film was 45-50 micrometers.

Hardness

Hardness was measured after 10 h, 36 h, 61 h and 120 h. The hardness was measured with pendel hardness meter from company BYK. Units of hardness are König and Persoz Hardness was measured from dry film of 75 micrometers on a glass plate with the method which conforms ASTM D 4366 and DIN EN ISO 1522 standards. In Table 1 is presented the results of the hardness measurements.

TABLE 1

| Hardness measurements. | | |
| --- | --- | --- |
| Measured after | Hardness | Unit |
| 10 H | 49 | König |
| 10 H | 110 | Persoz |
| 36 H | 60 | König |

TABLE 1-continued

| Hardness measurements. | | |
| --- | --- | --- |
| Measured after | Hardness | Unit |
| 36 H | 160 | Persoz |
| 61 H | 85 | König |
| 61 H | 217 | Persoz |
| 120 H | 135 | König |
| 120 H | 325 | Persoz |

Adhesion Test

Adhesion was measured after 36 h and 72 h. The adhesion was measured with PosiTest AT-A (from company BYK) with 20 mm Doly size. The adhesion was measured from dry film of 75 microns. The Positest conforms to international standards including ASTM D4541/D7234, ISO 4624/16276-1, AS/NZS 1580.408.5.

Measured adhesion was >450 psi.

Gloss

A conventional gloss meter applicable for paint that measures under an angle of 60° was used in gloss measurements. Used equipment was Erichsen Picogloss meter 560 MC. This gloss measure conforms to standards: ISO 7668, ASTM D 523, DIN 67530, EN ISO 2813.

Measured gloss was 96.

If a lower gloss is desired for less transparent paints, this can be done by using small amounts (for example 1.5 w/W % calculated from the weight of the aerosol formulation) of normal matting agents, but not water scavengers.

Reuse

After 2 years the can was reused. The formulation was fully operational and the spray result was the same as of the freshly produced can. Also the characteristics of the drying and the dry film were according the values of the tests performed with the freshly produced can.

Reference Example

A formulation clear coat without the weak acid was produced in % w/w:

Density content: 0.861 g/ml 400 ml=344.4 g

|  | % w/w | H$_2$O cont | H$_2$O/400 ml can |
| --- | --- | --- | --- |
|  | | H$_2$O % | in g | ppm |
| Binder epoxy | 20 | — | — |
| Blocked hardener (ketamine) | 2 | — | — |
| MethylEthylKeton | 20 | 0.5% | 0.3444 | 1000 |
| Propylene glycol methyl ether | 10 | 0.1% | 0.0344 | 100 |
| Aceton | 13 | 0.5% | 0.2239 | 650 |
| Dimethylether | 35 | 0.05% | 0.0603 | 350 |
| total | 100 |  | 0.663 g | 1925 ppm |

The formed product had a shelf life of less than two weeks.

Example 2

A formulation clear coat with the weak acid was produced in % w/w, similarly to the reference example
Density content: 0.861 g/ml 400 ml=344.4 g

|  | % w/w | H$_2$O cont | H$_2$O/400 ml can |
|---|---|---|---|
|  | H$_2$O % | in gr | ppm |
| Binder epoxy | 20 | — | — |
| Blocked hardener (ketamine) | 2 | — | — |
| MethylEthylKeton | 20 | 0.5% | 0.3444 | 1000 |
| Propylene glycol methyl ether | 10 | 0.1% | 0.0344 | 100 |
| Acetic acid | 1.7 | — | — |
| Aceton | 13 | 0.5% | 0.2239 | 650 |
| Dimethylether | 33.3 | 0.05% | 0.0573 | 350 |
| total | 100 |  | 0.6148 g | 1916 ppm |

The addition of 1.7% w/w acetic acid did not influence the manufacturing and testing of the formulation. The can was aged 3 months in an oven at 45° C. From previous experience it is well know that aging simulation can be used to accelerate the stability loss. Three months at 45° C. corresponds to a shelf life of 3 years or more at 25° C.

Examples 3-8

The further formulations were made similarly to example 1 with the exceptions of the used component materials. Table 2 lists the tested chemicals and chemical compositions.

The manufacturing of the liquid phase and the filling of the aerosol can were made similarly to the description in Example 1.

The test results give the same results as discussed in example 1 within a margin of approximately 5%. This represents an extraordinary high quality, prepared with an aerosol can that can be reused at any desired moment and has the shelf life of approximately 3 years.

consisting of an imine, an enamine, a Mannich base, an aldimine, and mixtures thereof;
a weak acid having a dissociation constant pKa value in a range from 1.2 to 5.2; and
an optional solvent;
b) mixing the paint forming chemicals, the weak acid and the optional solvent to obtain a mixture; and
c) adding a propellant, wherein
the method excludes adding water scavengers resulting to the mixture comprising water in an amount of more than 0 ppm and up to 2500 ppm, and wherein
the weak acid is added in presence of ketone or ketone and aldehyde in a catalytic amount from 0.1 to 5% by weight (w/w) of the aerosol formulation, to shift reaction balance of reaction (2a) in the can to favor formation of epoxy hardener precursors (2a)

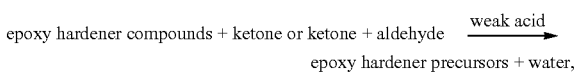
epoxy hardener compounds + ketone or ketone + aldehyde $\xrightarrow{\text{weak acid}}$ epoxy hardener precursors + water, so that formation of the epoxy hardener compounds is prevented from the epoxy hardener precursors in the can allowing use of the aerosol paint formulation after filling the can for at least six months, and wherein upon spraying the paint formulation out from the can, due to humidity of air, the hardener precursor becomes hydrolyzed to a hardener and starts polymerization reaction with epoxy monomers forming a paint film that is touch dry after 30 minutes, has a gloss in a range of 10-100 under an angle of 60°, and has König-hardness over 40 after 10 hours and over 100 after 120 h of drying-time, measured with a pendel hardness meter.

2. An aerosol paint-formulation in a same space of an aerosol can, wherein the aerosol paint-formulation in the aerosol can contains an epoxy resin, an epoxy hardener precursor, a catalytic amount of weak acid in a range of 0.1-5% by weight (w/w) of the aerosol formulation, a

TABLE 2

|  | example 2 | example 3 | example 4 | example 5 | example 6 | example 7 | example 8 |
|---|---|---|---|---|---|---|---|
| component 1: | bisphenol A epoxy resin | bisphenol A epoxy resin | novolac epoxy resin | bisphenol F epoxy resin | bisphenol A epoxy resin | bisphenol A epoxy resin | bisphenol F epoxy resin |
| component 2: | ethylenediamine and methyl isobutyl ketone | 3,3,5-trimethylcyclohexanone with secondary diamine | N,N'Bis(dimethylbutylidine)ethylenediamine (curamine 33-672) | Isopherone-diamine, MIBK reaction product (curamine 33-891) | N,N'Bis(dimethylbutylidine)ethylenediamine (curamine 33-672) | Isopherone-diamine, MIBK reaction product curamine 33-891 | 3,3,5-trimethylcyclohexanone with secondary diamine |
| component 3: | Methylethyl ketone | Methylethyl ketone | Methylethyl ketone | Methylethyl ketone | Methylethyl ketone | Methylethyl ketone | Methylethyl ketone |
| component 4: | xylene | xylene | methyl iso-butylketone | methyl iso-butylketone | 1-methoxy-2-propanol | 1-methoxy-2-propanol | methyl iso-butylketone |
| component 5: | Dimethyl ether | Dimethyl ether | Dimethyl ether | Dimethyl ether | Dimethyl ether | Dimethyl ether | Dimethyl ether |
| component 6: | acetic acid | propionic acid | Benzoic acid | acetic acid | Benzoic acid | Acetic acid | Benzoic acid |

The invention claimed is:

1. A method for preventing epoxy hardener compounds to be formed from epoxy hardener precursors in an aerosol formulation in an aerosol can for making a paint or an adhesive, the method comprising:

a) adding into a same space in the aerosol can:

paint forming chemicals comprising an epoxy resin, and epoxy hardener precursors selected from the group propellant, an optional solvent, and water in an amount of more than 0 ppm and less 2500 ppm, wherein the epoxy hardener precursor is selected from the group consisting of an imine, an enamine, a Mannich base, an aldimine, and mixtures thereof, and the aerosol paint-formulation is prepared without adding water-scavengers, and wherein the catalytic amount of weak acid shifts a reaction balance in the can such that formation of epoxy hardener compounds is prevented from the epoxy hardener precursors enabling use of the aerosol paint formulation for at least six months after filling the can, and wherein upon spraying the paint formulation out from the can, due to humidity of air, the hardener precursor becomes hydrolyzed to a hardener and starts polymerization reaction with epoxy monomers forming a paint film that is touch dry after 30 minutes, has a gloss in a range of 10-100 under an angle of 60° and has König-hardness over 40 after 10 hours and over 100 after 120 h of drying-time, measured with a pendel hardness meter.

3. The method of claim 1, wherein the method prevents the epoxy hardener compounds to be formed from hardener precursors in the can for an extended time period of 0.5-3 years.

4. The aerosol formulation of claim 2, wherein adhesion of the dry film of the paint is >450 psi, in PosiTest.

5. The method according to claim 1, wherein a catalytic amount of the weak acid is from 0.1 to 3% (w/w).

6. The method according to claim 1, wherein the catalytic amount of the weak acid enables pH 3-6 to be reached in the formulation.

7. The method according to claim 1, wherein the weak acid is selected from carboxylic acids and/or carbonic acids.

8. The method of claim 1, wherein the weak acid is selected from the group consisting of formic acid, acetic acid, propionic acid, butyric acid, valeric acid, caproic acid, oxalic acid, lactic acid, malic acid, citric acid, benzoic acid, and mixtures thereof.

9. The method of claim 1, wherein the epoxy resin is mixed with the weak acid and the optional solvent and the epoxy hardener precursor is subsequently introduced into the mixture.

10. The method of claim 1, wherein a mixing time for the paint forming chemicals after the addition of the hardener precursor is less than 15 minutes per 1000 litres of the mixture.

11. A method for forming a paint layer on a target surface, comprising spraying the aerosol formulation of claim 2 out from the can, wherein upon spraying out of the can the hardener precursor of the mixture hydrolyzes and forms an amine that reacts with the epoxy binder creating a cross linking film.

12. The aerosol formulation of claim 2, wherein the imine is a reaction product of ethylenediamine and methyl isobutyl ketone, diethyl ketone-based di-imine, N,N'-di(1-ethylpropylidene)-m-xylylenediamine, or mixtures thereof.

13. The aerosol formulation of claim 2, wherein the enamine is a reaction product of 3,3,5-trimethylcyclohexanone with secondary diamines, or a reaction product of isophoronediamine and methyl isobutyl ketone, or N,N, bis(1,3-dimethylbutylidine)ethylenediamine.

14. The aerosol formulation of claim 2, further comprising oxazolidines selected from the group consisting of 3-oxazolidineethanol,2-(1-methylethyl)-,3,3-carbonate, and N-butyl-2-(1-ethylpentyl)-1,3-oxazolidine.

15. The aerosol formulation of claim 2, wherein the formulation further comprises at least one solvent.

16. The aerosol formulation of claim 2, wherein the solvent is ketone.

17. The aerosol formulation of claim 2, wherein the epoxy resin is selected from the group consisting of bisphenol A epoxy resin, bisphenol F epoxy resin, novolac epoxy resin, aliphatic epoxy resin, glycidylamine epoxy resin, and mixtures thereof.

18. The aerosol formulation of claim 2, wherein a dry film of the paint is transparent and has a gloss in a range of 90-100, under an angle of 60°.

19. The aerosol formulation of claim 2, wherein a catalytic amount of the weak acid is from 0.1 to 3% (w/w).

20. A method for preventing epoxy hardener compounds to be formed from epoxy hardener precursors in an aerosol formulation in an aerosol can for making a paint or an adhesive, the method comprising
a) adding into the can under ambient conditions:
paint forming chemicals comprising an epoxy resin, and epoxy hardener precursors selected from imines, enamines, Mannich bases, aldimines or their mixtures, wherein the imines are selected from the group consisting of reaction products of ethylenediamine and methyl isobutyl ketone, diethyl ketone-based di-imine, N,N'-di(1-ethylpropylidene)-m-xylylenediamine, and mixtures thereof, enamines being reaction products of 3,3,5-trimethylcyclohexanone with secondary diamines, reaction products of isophoronediamine and methyl isobutyl ketone, or N,N, bis(1,3-dimethylbutylidine)ethylenediamine or mixtures thereof;
a weak acid having a dissociation constant pKa value in a range from 1.2 to 5.2; and
an optional solvent;
b) mixing the paint forming chemicals, the weak acid and the optional solvent to obtain a mixture; and
c) adding a propellant, wherein
the method excludes adding water scavengers resulting to presence of water in the mixture in an amount of more than 0 ppm and up to 2500 ppm, and wherein
the weak acid is added in presence of ketone or ketone and aldehyde in a catalytic amount from 0.1 to 5% by weight (w/w) of the aerosol formulation, to shift reaction balance of reaction (2a) in the can to favor formation of epoxy hardener precursors (2a)

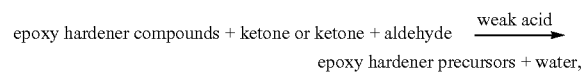

so that formation of the epoxy hardener compounds is prevented from the epoxy hardener precursors in the can allowing use of the aerosol paint formulation after filling the can for at least six months, and wherein upon spraying the paint formulation out from the can, due to humidity of air, the hardener precursor becomes hydrolyzed to a hardener and starts polymerization reaction with epoxy monomers forming a paint film that is touch dry after 30 minutes, has a gloss in a range of 10-100 under an angle of 60°, and has König-hardness over 40 after 10 hours and over 100 after 120 h of drying-time, measured with a pendel hardness meter.

* * * * *